United States Patent [19]
Sano

[11] Patent Number: 5,971,633
[45] Date of Patent: Oct. 26, 1999

[54] METHOD AND DEVICE FOR PRINTING OBJECTS ON A MEDIUM USING SQUARE SUB-BANDS

[75] Inventor: Makoto Sano, Ebina, Japan

[73] Assignee: Fuji Xerox Co., Ltd., Tokyo, Japan

[21] Appl. No.: 08/987,233

[22] Filed: Dec. 9, 1997

[30] Foreign Application Priority Data

Dec. 13, 1996 [JP] Japan ................................ 8-334238

[51] Int. Cl.⁶ ........................................ B41J 11/44
[52] U.S. Cl. ............................ 400/76; 400/61; 400/70
[58] Field of Search ............................ 400/76, 61, 70, 400/63; 395/112, 113–119

[56] References Cited

U.S. PATENT DOCUMENTS

| | | | |
|---|---|---|---|
| 5,504,842 | 4/1996 | Gentile | 395/114 |
| 5,506,944 | 4/1996 | Gentile | 395/114 |
| 5,539,865 | 7/1996 | Gentile | 395/115 |
| 5,544,290 | 8/1996 | Gentile | 395/115 |
| 5,577,173 | 11/1996 | Dennis et al. | 395/116 |
| 5,588,095 | 12/1996 | Dennis et al. | 395/116 |
| 5,604,847 | 2/1997 | Dennis et al. | 395/116 |

FOREIGN PATENT DOCUMENTS

| | | |
|---|---|---|
| A-5-31974 | 2/1993 | Japan . |
| A-7-195753 | 8/1995 | Japan . |

*Primary Examiner*—Edgar Burr
*Assistant Examiner*—Charles H. Nolan, Jr.
*Attorney, Agent, or Firm*—Oliff & Berridge, PLC

[57] ABSTRACT

In an image processing device, when image data is expanded to width K corresponding to one-third of width L of a band buffer 26, the band buffer in which the width K image data is expanded is divided into square blocks each having side length K. When expansion of the image data in the square blocks into which the band buffer is divided is complete, the resultant image data is compressed for each square block. Thus, occurrence of generation can be prevented and the image data can be compressed efficiently. The locations of a final output image to which the compressed data corresponds are managed with a compressed page buffer management table, etc., so that the final output image can be restored based on the managed location information and image quality degradation can be avoided.

5 Claims, 8 Drawing Sheets

METHOD AND DEVICE FOR PRINTING OBJECTS ON A MEDIUM USING SQUARE SUB-BANDS

BACKGROUND OF THE INVENTION

1. Field of the Invention

This invention relates to an image processing device and a compression processing method and more particularly to an image processing device for performing image processing for page description data received from an external device and preparing output image data and a compression processing method of compressing image data prepared by performing image processing for page description data representing an image.

2. Description of the Related Art

The term "band buffer" in the specification is used to mean a memory for storing image data, corresponding to each of divisions into which a 1-page image area is divided.

Hitherto, an image processing device has been widely used which receives page description data represented in a page description language from an external information processing device, etc., and performs image processing for the received page description data for preparing image data to be printed, then transmits the prepared image data to an output unit such as a laster beam printer or an ink jet printer, which then prints an image on paper. To store a large amount of image data to be processed in a finite internal memory, the image processing device uses a technique of holding image data at an intermediate stage (intermediate data) in a compression state.

In processing wherein all 1-page page description data is converted into intermediate data and then the intermediate data is rasterized in synchronization with the output processing performance of an output unit and is output from the output unit, an art of determining whether or not the intermediate data is to be compressed based on the rasterization processing time and the empty capacity of a memory and compressing the intermediate data whenever necessary in response to the determination result is proposed, for example, in Japanese Patent Laid-Open No. Hei 7-195753.

By the way, in recent years, high-speed color printers have been developed and are becoming pervasive rapidly meeting demands for color image printing and speeding up the printing.

However, to apply the art described in Japanese Patent Laid-Open No. Hei 7-195753 to such a high-speed color printer and rasterize and output intermediate data in synchronization with the output processing performance of the color printer, a bus width about three times that of the output processing performance of the color printer becomes necessary for an ESS (electric device) in the image processing device; the image processing device needs to be provided with special hardware.

Then, before transmitting image data to an output unit, the image processing device can adopt an art of compressing rasterized image data and storing the compressed data in a compressed page buffer, then decomposing the stored data in synchronization with the output processing performance of the output unit and transmitting the data to the output unit at the print-out time.

An art of dividing a 1-page image area into subareas and preparing image data from page description data and compressing the data for each subarea is proposed, for example, in Japanese Patent Laid-Open No. Hei 5-31974.

By the way, data represented by page description data is roughly classified into the three types: Characters (text), graphics, and images, such as images read through a scanner. A large-capacity memory is required to perform image processing for page description data representing an image. Particularly, to rotate an image by an angle other than 90 or 180 degrees (arbitrary angle rotation processing) in a print image area in image processing, for example, as shown in FIG. 3, image area Q fitted within one band buffer width L extends across three band buffers (bands 0, 1, and 2 in FIG. 3), a large-capacity memory area being required.

However, the art described in Japanese Patent Laid-Open No. Hei 5-31974 does not consider large-capacity memory consumption in image processing for the page description data representing an image.

To actually perform arbitrary angle rotation processing as shown in FIG. 3, for example, a sequence of steps of performing arbitrary angle rotation processing for the page description data representing an image little by little (in small scan line units), compressing image data expanded in band buffers, temporarily storing the compressed data in the memory, and before completion of the arbitrary angle rotation processing for all data, decomposing the already compressed image data little by little and transmitting the decomposed data to a printer must be executed to use the finite memory built in the image processing device. Thus, it becomes necessary to repeat compressing and decompressing because of memory shortage, leading to worsening of processing efficiency and degradation of image quality.

SUMMARY OF THE INVENTION

It is therefore an object of the invention to provide an image processing device and a compression processing method capable of compressing image data efficiently for improving processing efficiency and performing image rotation processing without remarkably degrading image quality.

To the end, according to a first aspect of the invention, there is provided an image processing device comprising selection means for selecting page description data representing an image among page description data described in a page description language, image data preparation means for performing image processing for the page description data representing an image selected by the selection means and preparing image data as image data representing the image, expansion means for expanding the image data prepared by the image data preparation means in a band buffer in sequence so that a final output image is formed virtually, division means, each time the image data expanded by the expansion means is expanded to width K corresponding to 1/N of the band buffer width (where N is a predetermined integer of 3 or more), for dividing the band buffer in which the width K image data is expanded into square blocks each having a side length equal to the width K, compression means, when expansion of the image data in the square blocks into which the band buffer is divided by the division means is complete, for compressing the resultant image data in square block units, and storage means for storing the image data compressed by the compression means in a compressed data memory until the image data is output.

In a second aspect of the image processing device, the width K corresponds to one-third of the band buffer width in the image processing device according to the first aspect of the invention.

According to a third aspect of the invention, there is provided a compression processing method of compressing image data prepared by performing image processing for page description data representing an image, the method comprising the steps of expanding the prepared image data in a band buffer in sequence so that a final output image is formed virtually, each time the image data is expanded to width K corresponding to 1/N of the band buffer width (where N is a predetermined integer of 3 or more), dividing the band buffer in which the width K image data is expanded into square blocks each having a side length equal to the width K, and when expansion of the image data in the square blocks into which the band buffer is divided is complete, compressing the resultant image data in square block units.

According to a fourth aspect of the invention, there is provided an image processing device comprising selection means for selecting page description data representing an image among page description data described in a page description language, image data preparation means for performing image processing for the page description data representing an image selected by the selection means and preparing image data as image data representing the image, first expansion means for expanding the image data prepared by the image data preparation means in a band buffer in sequence so that a final output image is formed virtually, completion sense means for sensing completion of expansion of the image data to be expanded by the first expansion means for each of predetermined subareas into which the band buffer is divided, compression means, when completion of expansion of the image data is sensed by the completion sense means, for compressing in sequence the image data in the subareas where the expansion completion is sensed, management means for managing locations of the final output image to which the data in the subareas compressed by the compression means corresponds, decompression means for decompressing the data in the subareas compressed by the compression means, and second expansion means for expanding the image data decompressed by the decompression means in an area on the band buffer determined based on location information managed by the management means.

In a fifth aspect of the image processing device, the image processing performed by the image data preparation means is rotation processing in the image processing device according to the fourth aspect of the invention.

In the image processing device according to the first aspect of the invention, page description data representing an image is selected by the selection means among page description data described in a page description language representing characters (text), graphic forms, images, etc. Further, image processing is performed for the selected page description data representing an image and image data as image data representing the image is prepared by the image data preparation means. The prepared image data is expanded in the band buffer in sequence by the expansion means so that a final output image is formed virtually.

In the final output image formed virtually, each time the image data is expanded to the width K corresponding to 1/N of the band buffer width (where N is a predetermined integer of 3 or more), the band buffer in which the width K image data is expanded is divided by the division means into square blocks each having a side length equal to the width K. When expansion of the image data in the square blocks into which the band buffer is divided is complete, the resultant image data is compressed in square block units by the compression means. Further, the compressed image data is stored in the compressed data memory by the storage means until the image data is output.

In the image processing device according to the first aspect of the invention, in the final output image formed virtually, when the image data is expanded to the width K corresponding to 1/N of the band buffer width (where N is a predetermined integer of 3 or more), the band buffer in which the width K image data is expanded is divided into square blocks each having a side length equal to the width K. Upon completion of expansion of the image data in the square blocks into which the band buffer is divided, the resultant image data is compressed in square block units.

The band buffer in which the width K image data is expanded is divided into square blocks each having a side length equal to the width K and the image data is compressed for each of the square blocks into which the band buffer is divided, whereby occurrence of generation can be prevented for the following reason:

The reason why occurrence of generation can be prevented will be discussed by taking the width K equal to one-third of the band buffer width as an example.

If one graphic form is divided into squares of a predetermined size and one of the squares, A1, is taken out and is placed in a group of the squares of the same size, A2, as shown in FIG. 2, although the square A1 is placed at any position and any gradient relative to the square group A2, it overlaps six or less squares in the square group A2. Therefore, to expand image data of one graphic form unit (in this case, square A1), six blocks of the same size as the graphic form unit need only to exist.

On the other hand, focusing attention on image data on one scan line, the aspect ratio of one page of paper size is about 1.4. Therefore, considering expansion of image data on a scan line in the long side direction of paper in the short side direction thereof by 90-degree rotation, it is desirable to provide the band buffer with a margin about 1.4 times.

Thus, to expand image data of one graphic form unit with 6×(1.4)=(8.4), nine blocks of the same size as the graphic form unit need only to exist and arbitrary angle rotation processing in image processing can also be covered. Thus, if the size of one block is set to one-third of the band buffer width, nine blocks can be provided within the band buffer width and the image data in one graphic form unit can be expanded reliably within the band buffer width.

Although the width K equal to one-third of the band buffer width is taken as an example, if the width K is 1/N of the band buffer width (where N is a predetermined integer of 3 or more), the image data in one graphic form unit can be expanded reliably within the band buffer width as in the description given above. Thus, if arbitrary angle rotation processing of an image is performed, occurrence of generation can also be prevented. That is, the image data can be compressed efficiently and image data processing efficiency can be improved.

However, the smaller the width K, the greater the number of square blocks. Thus, the image data compression processing load for each square block grows and management information required to store the compressed image data in the compressed data memory grows. Therefore, it is the most desirable to set the width K to one-third of the band buffer width as in the second aspect of the invention from the viewpoints of preventing the compression processing load and the management information from growing.

In the compression processing method according to the third aspect of the invention, the image data prepared by performing image processing for page description data representing an image is expanded in the band buffer in sequence so that a final output image is formed virtually. Each time the image data is expanded to the width K corresponding to 1/N of the band buffer width (where N is a predetermined integer of 3 or more), the band buffer in which the width K image data is expanded is divided into square blocks each having a side length equal to the width K. When expansion of the image data in the square blocks into which the band buffer is divided is complete, the resultant image data is compressed in square block units.

Also in the compression processing method according to the third aspect of the invention, occurrence of generation can also be prevented and the image data can be compressed efficiently according to principles similar to those of the first aspect of the invention.

In the image processing device according to the fourth aspect of the invention, page description data representing an image is selected by the selection means among page description data described in a page description language and image processing is performed for the selected page description data representing an image and image data is prepared by the image data preparation means. The prepared image data is expanded in the band buffer in sequence by the first expansion means so that a final output image is formed virtually. It is previously determined that the band buffer is divided into subareas.

In the image data expansion, completion of expansion of the image data to be expanded for each of the subareas is sensed by the completion sense means. When completion of expansion of the image data is sensed, the image data in the subareas where the expansion completion is sensed is compressed in sequence by the compression means, and the locations of the final output image to which the compressed data in the subareas corresponds are managed by the management means.

When the image data is output, etc., the compressed data in the subareas is decompressed by the decompression means and the decompressed image data is expanded by the second expansion means in the area on the band buffer determined based on the managed location information.

The locations of the final output image to which the data compressed temporarily for each subarea corresponds are managed. Thus, if the image data is compressed in a worm-eaten manner for the final output image, the final output image can be restored.

Particularly, if rotation processing, such as arbitrary angle rotation processing, is performed by the image data preparation means according to the fifth aspect of the invention, the final output image can be restored based on the location information corresponding to the compressed data for each subarea and image quality degradation can be avoided although formerly it was difficult to restore the final output image and it was feared that image quality degradation would occur.

That is, the final output image subjected to predetermined image processing (particularly, arbitrary angle rotation processing) can be provided without causing generation to occur in a limited-capacity memory, whereby image rotation processing can be performed without remarkably degrading the image quality.

The above and other objects and features of the present invention will be more apparent from the following description taken in conjunction with the accompanying drawings.

DETAILED DESCRIPTION OF THE PREFERRED EMBODIMENTS

Referring now to the accompanying drawings, there is shown a preferred embodiment of the invention. First, the configuration of an image formation device of the embodiment will be discussed.

Figure 1:
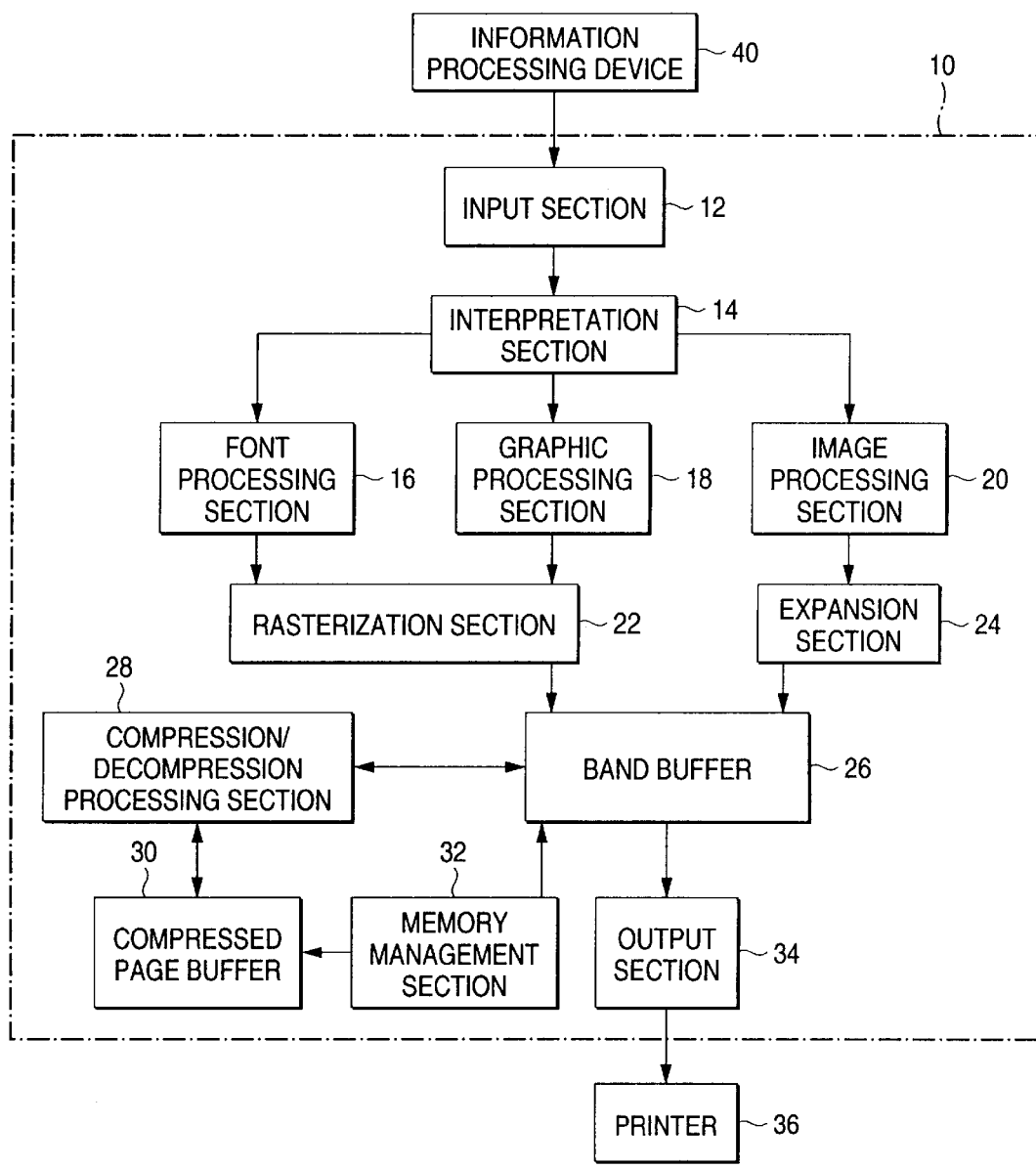
FIG. 1 is a block diagram to show a schematic configuration of an image processing device of an embodiment of the invention.
Figure 2:
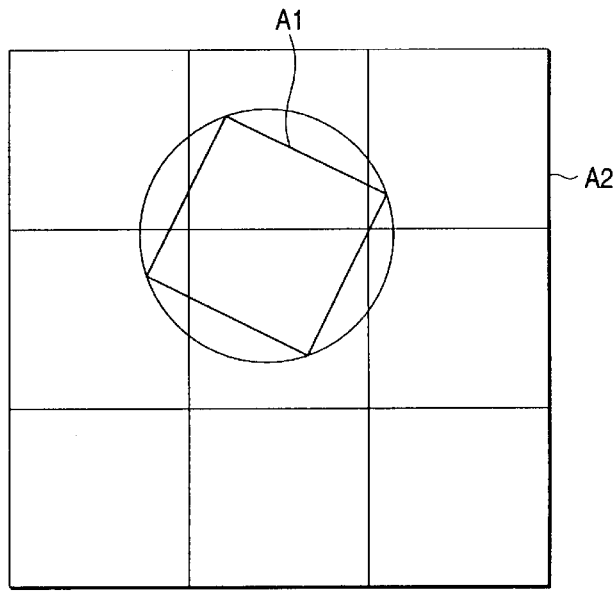
FIG. 2 is an illustration to explain the effect of setting the macro block size to one-third of the band buffer width.

FIG. 1 is a functional block diagram of an image processing device 10 of the embodiment. The image processing device 10 comprises an input section 12 serving as an input interface in the image processing device 10 for receiving page description data from an external information processing device 40 and an interpretation section 14 for interpreting the page description data received at the input section 12. The interpretation section 14 classifies the received page description data into the three types of page description data representing characters (text), page description data representing graphics, and page description data representing images, and transfers the page description data representing characters (text) to a font processing section 16, the page description data representing graphics to a graphic processing section 18, and the page description data representing images to an image processing section 20.

The font processing section 16 prepares an intermediate language from the font, character code, etc., specified in the page description data and the graphic processing section 18 prepares an intermediate language from the graphic form information, etc., specified in the page description data. The intermediate language prepared by the font processing section 16 or the graphic processing section 18 is transferred to a rasterization section 22, which then rasterizes the intermediate language and transfers the raster data prepared by the rasterization to a band buffer 26 for expanding the raster data.

The raster data expanded in the band buffer 26 is compressed by a compression/decompression processing section 28 and is stored in a compressed page buffer 30. At the output time, the compression/decompression processing section 28 reads the compressed data from the compressed page buffer 30, decompresses the data, and again expands the decompressed data in the band buffer 26. The raster data expanded in the band buffer 26 is sent by an output section 34 to a printer 36 as an external output unit.

On the other hand, the image processing section 20 executes image processing of face sequential/point sequential correction, correction of the number of gray scale levels, color conversion, scaling, rotation, etc., in scan line units based on the page description data. The image data subjected to the image processing is transferred to an expansion section 24 in scan line units and the expansion section 24 expands the image data in the band buffer 26.

The storage area of the band buffer 26 is managed by a memory management section 32. When the image data is expanded to one-third of the width of the band buffer 26, the memory management section 32 divides the one-third wide (width K) storage area into square blocks each having side length K.

The data in the blocks is compressed by the compression/decompression processing section 28 for each block and the compressed image data is stored in the compressed page buffer 30. The storage area of the compressed page buffer 30 is also managed by the memory management section 32. At the output time, the compression/decompression processing section 28 reads the compressed image data from the compressed page buffer 30, decompresses the data, and again expands the decompressed data in the band buffer 26. The image data expanded in the band buffer 26 is sent by the output section 34 to the printer 36 as an external output unit.

Next, the operation of the embodiment will be discussed. Here, image processing of the image processing device 10 will be discussed with reference to flowcharts in FIGS. 8–10.

Figure 8:
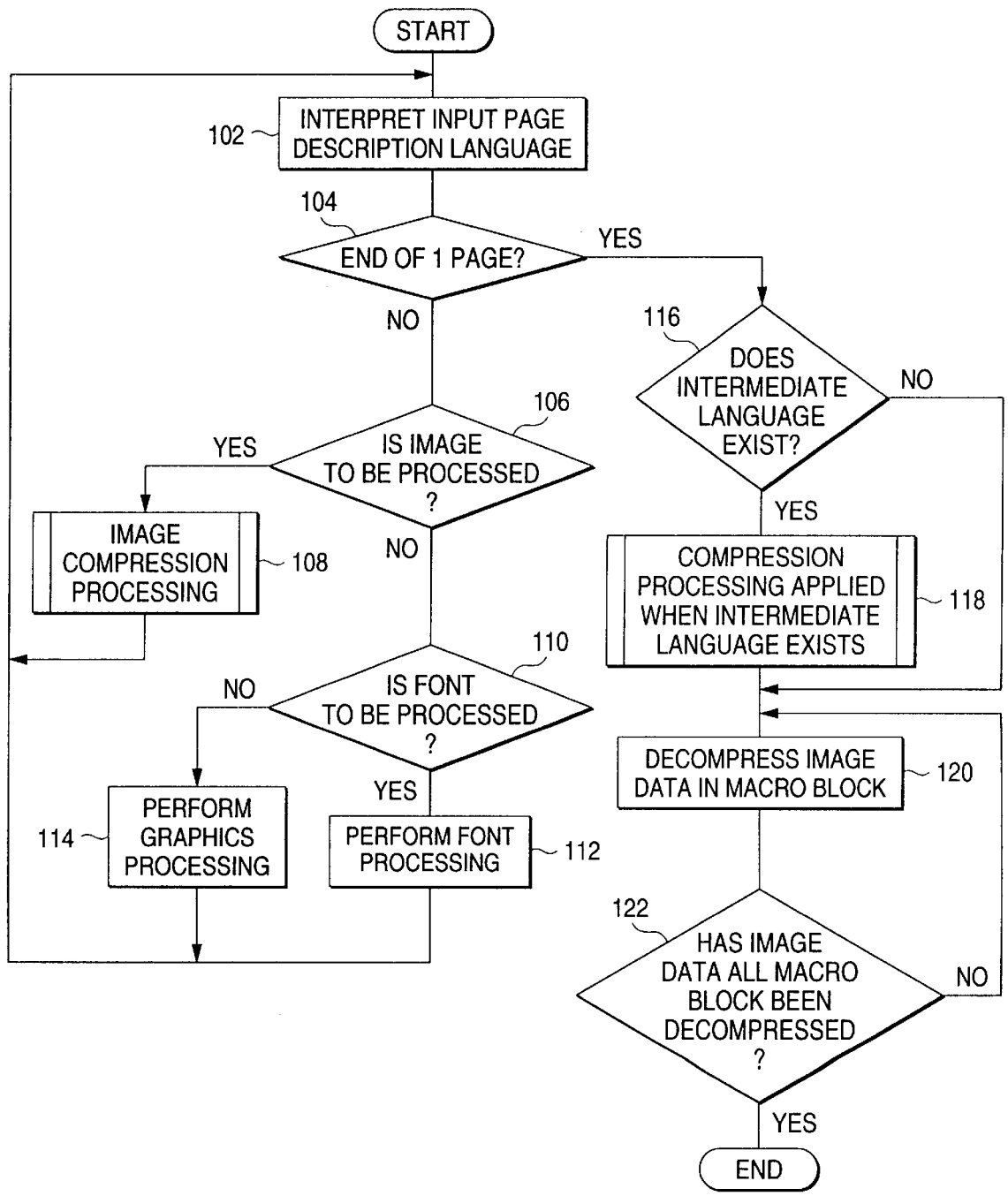
FIG. 8 is a flowchart to show a processing routine in the image processing device of the embodiment of the invention.
Figure 9:
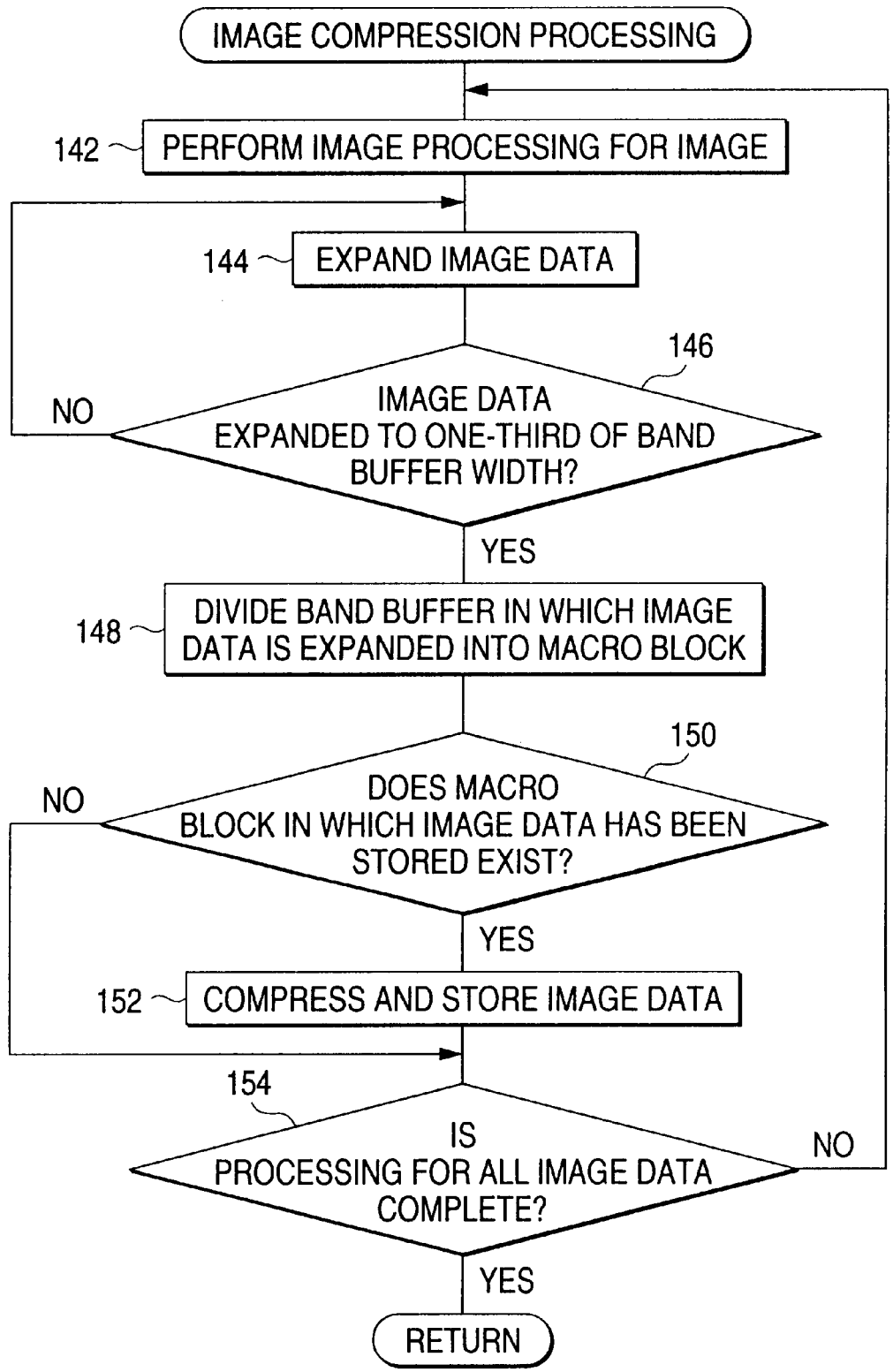
FIG. 9 is a flowchart to show an image compression processing subroutine.

At step 102 in FIG. 8, a page description language is input through the input section 12 from the external information processing device 40 and the input page description language is interpreted by the interpretation section 14. At step 104, whether or not processing for the page description language for one page is complete is determined based on whether or not a token indicating the page end is found. First, it is determined that the processing is not complete, and control goes to step 106.

At step 106, whether or not an image is to be processed is determined based on the interpretation result at step 102. Here, if an image is to be processed, control goes to step 108 and an image compression processing subroutine is executed.

The image compression processing will be discussed. First, at step 142 in FIG. 9, image processing is performed for the image based on the page description language contents. For example, image processing of face sequential/point sequential correction, correction of the number of gray scale levels, color conversion, scaling, arbitrary angle rotation processing, etc., is executed in scan line units. At step 144, the image data subjected to the image processing is transferred to the expansion section 24 in scan line units and the expansion section 24 expands the image data in the band buffer 26 in scan line units until it expands the image data to the width K corresponding to one-third of the band buffer width L in FIG. 3. When the image data is expanded to the width K, control goes to step 148 and the band buffer in which the image data is expanded to the width K is divided into square blocks each having side length K by the memory management section 32.

Figure 3:
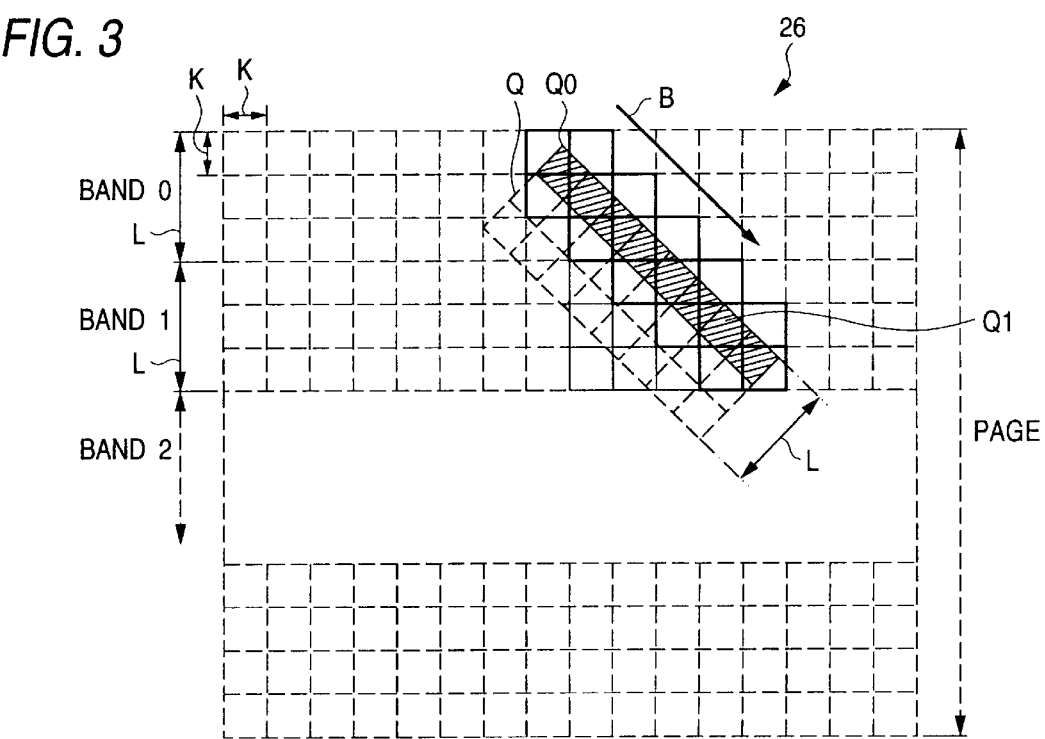
FIG. 3 is an illustration to explain the relationship between macro blocks and bands.

For example, as shown in FIG. 3, the image data representing image Q is expanded in the band buffer 26 in scan line units along the arrow B direction with vertex Q0 as the start point. When the image data is expanded to the width K corresponding to one-third of the width L of the band buffer 26 (expanded only in area Q1 in FIG. 3), bands 0 and 1 are divided into square macro blocks each having side length K. The image data in the area Q1 in FIG. 3 is stored in macro blocks indicated by heavy solid lines in FIG. 3.

Figure 7:
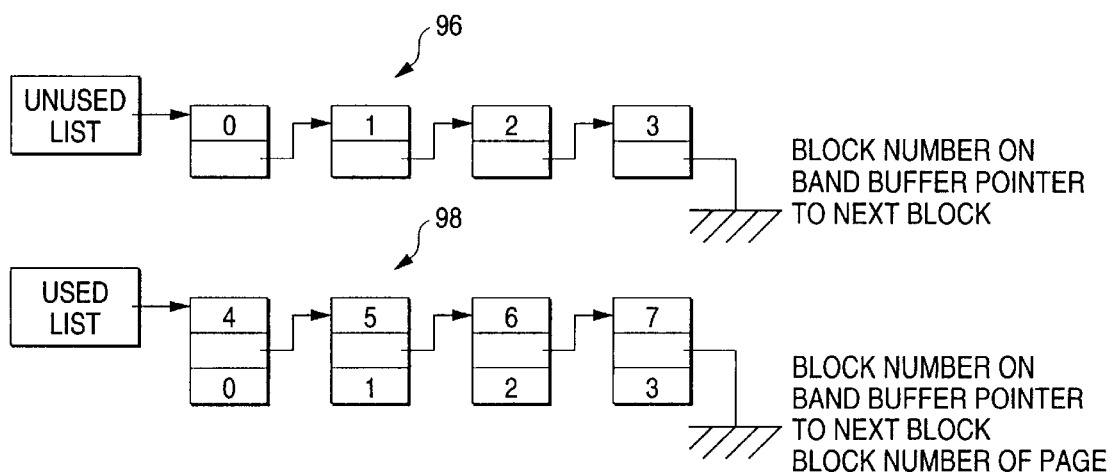
FIG. 7 is an illustration to show a management table for managing the use state of a band buffer.

The band buffer 26 is managed by the memory management section 32 with a unused list 96 for managing unused macro blocks and a used list 98 for managing used macro blocks, as shown in FIG. 7.

At step 150, whether or not the macro blocks into which bands are divided contain a macro block in which the image data has been stored is determined. At step 152, the image data in the macro block in which the image data has been stored is compressed by the compression/decompression processing section 28 and the compressed image data is stored in the compressed page buffer 30 shown in FIG. 5 (B). The storage area of the compressed page buffer 30 is also managed by the memory management section 32 with a compressed page buffer management table 92.

Figure 4:
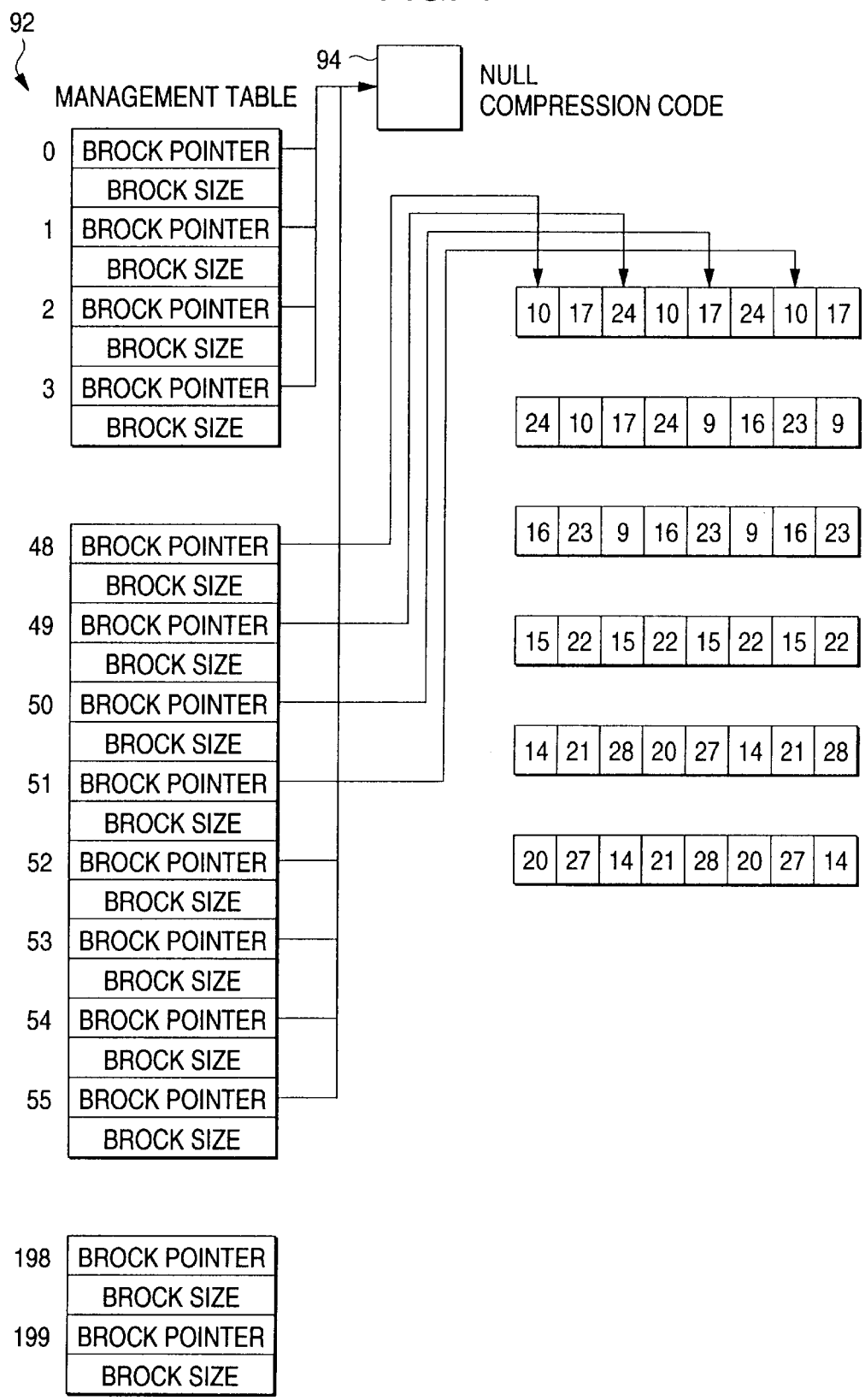
FIG. 4 is an illustration to show a management table for managing the use state of a compressed page buffer.

In the compressed page buffer management table 92 in FIG. 4, management table numbers 0–199 correspond to macro block numbers. FIG. 4 shows an example wherein one output page is divided into 50 macro blocks. Face-sequential compression is executed for the macro blocks and four color entries of black, yellow, magenta, and cyan are provided for each macro block, so that 200 entries exist in the table in total. The address to the storage location of compression code 94 indicating that white is in the macro block is set as the initial value of each entry, thereby preventing fruitless compression processing from being performed for macro blocks in which image data is not stored. That is, compression processing is performed only for macro blocks in which image data is stored, so that it can be performed efficiently at high speed.

Figure 5A:
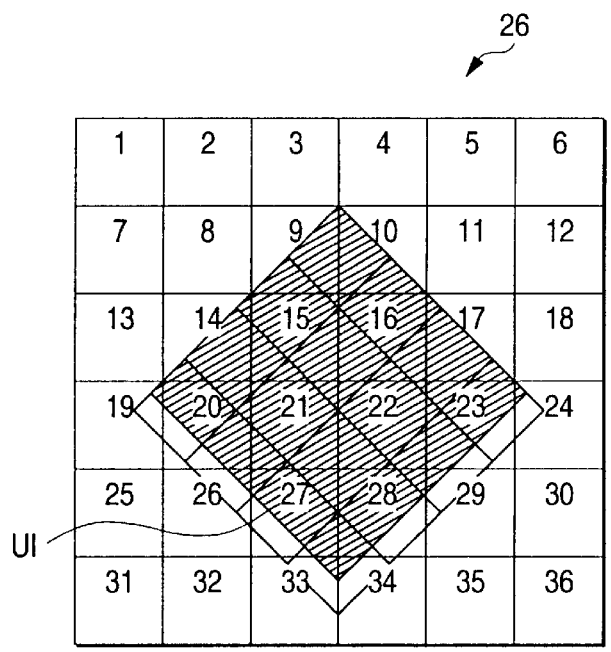
FIG. 5 (A) is an illustration to show an image area of an image to be printed and macro blocks for the image and (B) is an illustration to show a layout of a memory for storing the image data corresponding to the image in (A)
Figure 5B:
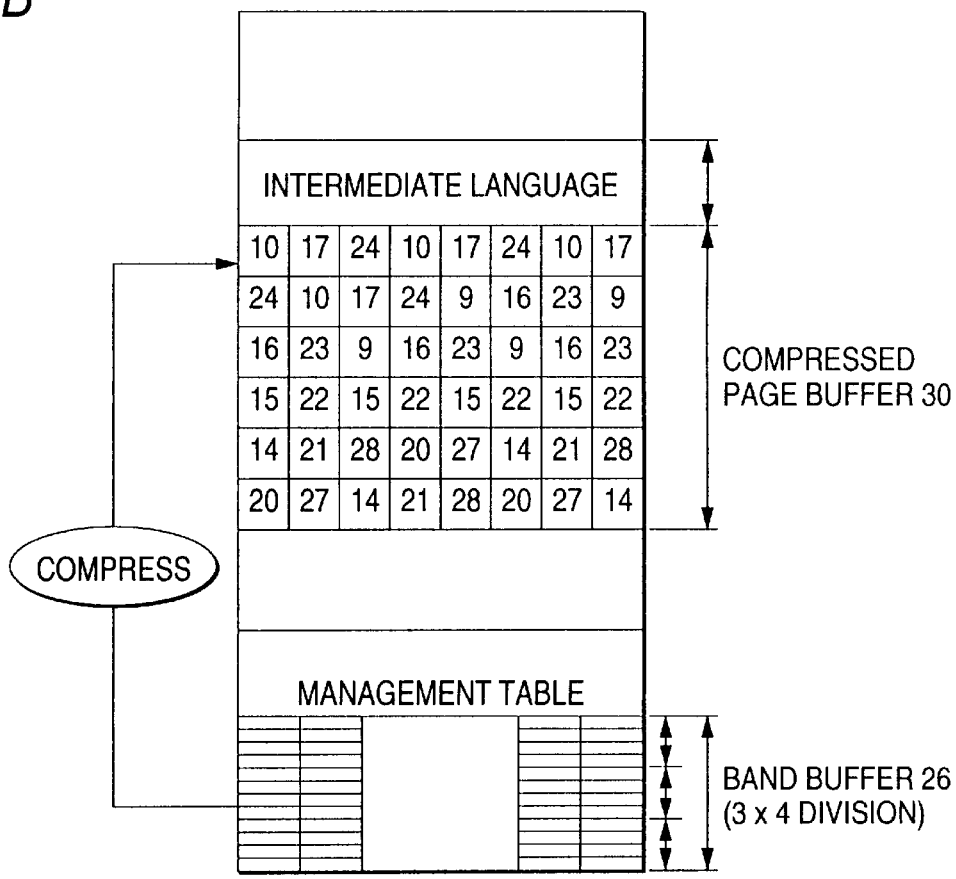

FIG. 5 (A) is an illustration of rotating image U1 45 degrees clockwise and expanding in the band buffer 26 and FIG. 5 (B) shows a state in which the image data of the image U1 has been stored in the compressed page buffer 30.

In the embodiment, when the image data is expanded to one-third of the width of the band buffer 26, the one-third wide (width K) storage area is divided into square macro blocks each having side length K by the memory management section 32 and the image data is compressed for each macro block. Thus, generation caused by memory shortage by arbitrary angle rotation, etc., according to the principle as described above can be avoided and efficient image data compression can be realized.

At step 154, whether or not compression processing for all image data is complete is determined. If image data for which compression processing is incomplete exists, control returns to step 142 and steps 142–152 are executed for the image data. Upon completion of the compression processing for all image data, control returns to the main routine in FIG. 8 and returns to step 102.

On the other hand, if no image is to be processed at step 106 in FIG. 8, control goes to step 110 and whether or not a font of characters, symbols, etc., is to be processed is determined. If a font is to be processed, control goes to step 112 and the font processing section 16 prepares an intermediate language from the font, character code, etc., specified in the page description data. On the other hand, if graphics rather than font are to be processed at step 110, control goes to step 114 and the graphic processing section 18 prepares an intermediate language from the graphic form information, etc., specified in the page description data. Then, control goes to step 102.

Figure 10:
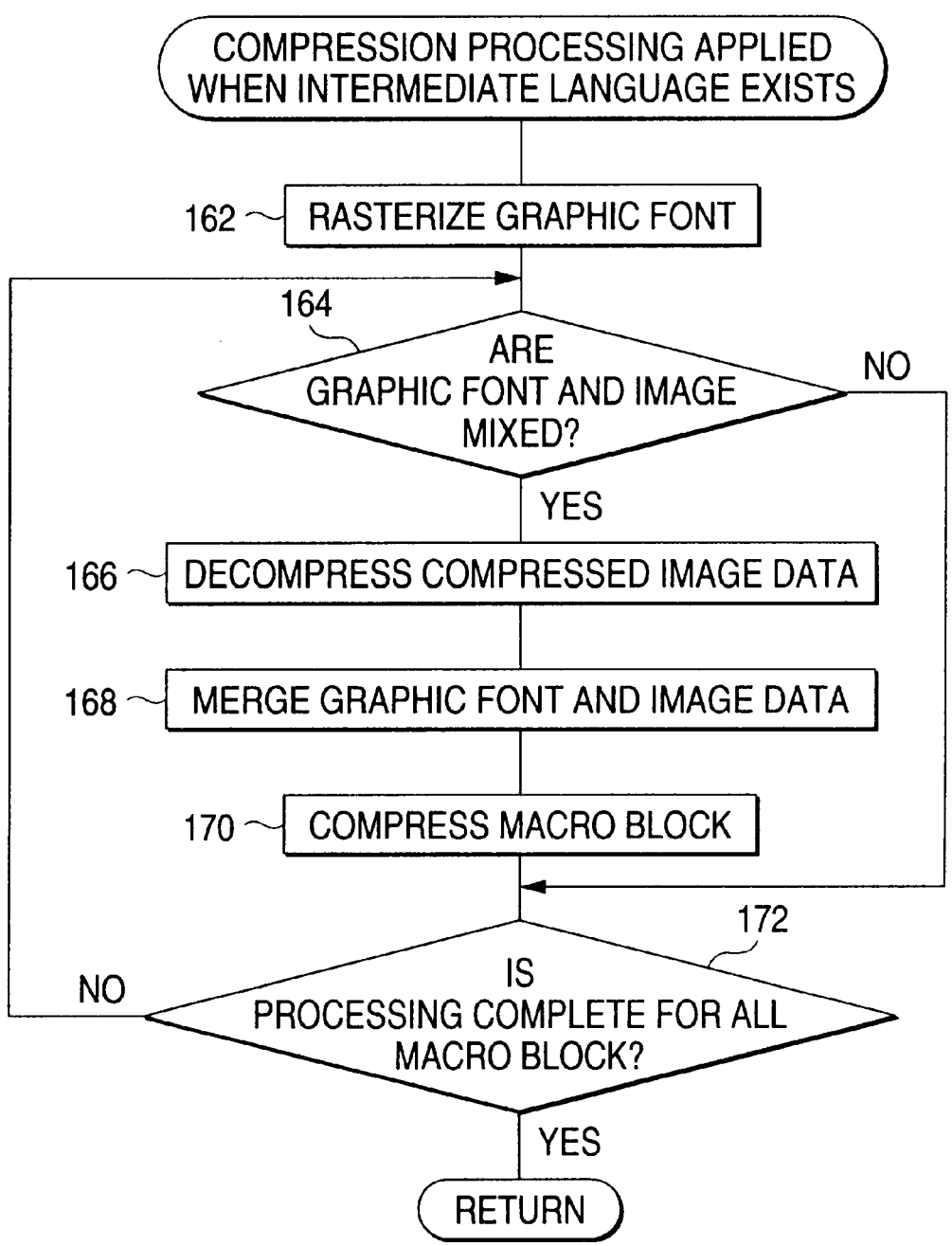
FIG. 10 is a flowchart to show a compression processing subroutine applied when an intermediate language exists.

When processing for the page description language for one page is complete and Yes is returned at step 104, control goes to step 116 and whether or not an intermediate language exists is determined. Only if an intermediate language exists, control goes to step 118 and a compression processing subroutine applied when an intermediate language exists shown in FIG. 10 is executed.

Here, the compression processing applied when an intermediate language exists will be discussed. First, font and graphics are rasterized at step 162 in FIG. 10. For the font, by taking an outline font as an example, a font database is searched for outline data corresponding to character code, hinting processing is performed, and rasterizing is performed. The rasterization result may be a bit map or a run-length compression format.

Figure 6:
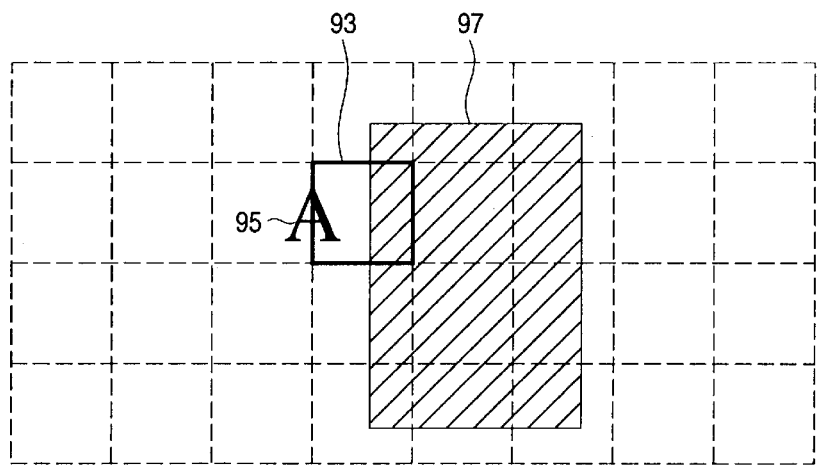
FIG. 6 is an illustration to explain merging of graphics and an image.

When the rasterized data and the image data stored in a compression state are expanded together in the band buffer 26, whether or not font graphics and an image are mixed in one macro block is determined at step 1643. Only when a character 95 as font data and an image 97 are mixed as in a macro block 93 shown in FIG. 6, for example, the compressed image data is decomposed by the compression/decompression processing section 28 at step 166. The decompressed image data and the rasterized data of font graphics are merged at step 168. In the merging, the top and bottom relationship between the image data and the font graphics is considered, of course. Further, the merged macro block data is compressed by the compression/decompression processing section 28 at step 170.

Then, the determination at step 164 is made for the remaining macro blocks in sequence. Only if font graphics and an image are mixed, steps 166–170 are executed.

In the embodiment, if font graphics and an image are not mixed, the image data is already stored in the compressed page buffer 30 in a compression state, thus need not be compressed again at this point in time. Therefore, image quality degradation can be prevented and fruitless processing can be skipped for improving processing efficiency of the image processing device 10.

When processing at steps 164–170 is thus complete for all macro blocks, control returns to the main routine in FIG. 8 and goes to step 120. At steps 120 and 122, the image data in the macro blocks is decompressed by the compression/decompression processing section 28 in synchronization with the output performance of the printer 36. It is desirable to decompress the image data by hardware to speed up the processing; if the image data is decompressed under software control, font and graphics need not be rasterized, thus the real-time property can be easily guaranteed as compared with the conventional real-time banding.

The decomposed image data in the macro blocks is output by the output section 34 to the printer 36.

According to the embodiment we have discussed, when the image data is expanded to one-third of the width of the band buffer 26, the one-third wide (width K) storage area is divided into square macro blocks each having side length K by the memory management section 32 and the image data is compressed for each macro block. Thus, generation caused by memory shortage by arbitrary angle rotation, etc., can be avoided and efficient image data compression can be realized.

If font graphics and an image are mixed on the same band, they are merged in macro units in the embodiment. That is, only macro blocks in which font graphics and an image are mixed are merged, and then compression processing is performed, thus can be localized and can be speeded up as compared with conventional compression in band units.

If font graphics and an image are not mixed in one macro block, image data needs to be compressed only once. Thus, image quality degradation can be prevented and fruitless processing can be skipped for improving the processing efficiency of the image processing device 10.

The locations of the final output image to which the data compressed temporarily in macro blocks corresponds are managed with the compressed page buffer management table, etc. Thus, if image data is compressd in a worm-eaten manner in the final output image, the final output image can be restored smoothly, whereby image processing, such as arbitrary angle rotation processing, can be performed without remarkably degrading the image quality.

According to the first or third aspect of the invention, when the image data is expanded to the width K corresponding to 1/N of the band buffer width (where N is a predetermined integer of 3 or more), the band buffer in which the width K image data is expanded is divided into square blocks each having a side length equal to the width K. Upon completion of expansion of the image data in the square blocks into which the band buffer is divided, the resultant image data is compressed for each square block, thus occurrence of generation can be prevented, whereby the image data can be compressed efficiently and image data processing efficiency can be improved.

According to the second aspect of the invention, the width K is set to one-third of the band buffer width, so that the compression processing load and the management information amount can be minimized.

According to the fourth or fifth aspect of the invention, the locations of the final output image to which the data in subareas compressed temporarily corresponds are managed. Thus, if the image data is compressed in a worm-eaten manner in the final output image, the final output image can be restored and rotation processing, such as arbitrary angle rotation processing, can be performed without remarkably degrading the image quality.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing device comprising:

selection means for selecting page description data representing an image among page description data described in a page description language;

image data preparation means for performing image processing for the page description data representing an image selected by said selection means and preparing image data as image data representing the image;

expansion means for expanding the image data prepared by said image data preparation means in a band buffer in sequence so that a final output image is formed virtually;

division means, each time the image data expanded by said expansion means is expanded to width K corresponding to 1/N of a band buffer width (where N is a predetermined integer of 3 or more), for dividing the band buffer in which the width K image data is expanded into square blocks each having a side length equal to the width K;

compression means, when expansion of the image data in the square blocks into which the band buffer is divided by said division means is complete, for compressing the resultant image data in square block units; and storage means for storing the image data compressed by said compression means in a compressed data memory until the image data is output.

2. The image processing device as claimed in claim 1 wherein the width K corresponds to one-third of the band buffer width.

3. A compression processing method of compressing image data prepared by performing image processing for page description data representing an image, said method comprising the steps of:

expanding the prepared image data in a band buffer in sequence so that a final output image is formed virtually;

each time the image data is expanded to width K corresponding to 1/N of a band buffer width (where N is a predetermined integer of 3 or more), dividing the band buffer in which the width K image data is expanded into square blocks each having a side length equal to the width K; and when expansion of the image data in the square blocks into which the band buffer is divided is complete, compressing the resultant image data in square block units.

4. An image processing device comprising:

selection means for selecting page description data representing an image among page description data described in a page description language;

image data preparation means for performing image processing for the page description data representing an image selected by said selection means and preparing image data as image data representing the image;

first expansion means for expanding the image data prepared by said image data preparation means in a band buffer in sequence so that a final output image is formed virtually;

completion sense means for sensing completion of expansion of the image data to be expanded by said first expansion means for each of predetermined subareas into which the band buffer is divided;

compression means, when completion of expansion of the image data is sensed by said completion sense means, for compressing in sequence the image data in the subareas where the expansion completion is sensed;

management means for managing locations of the final output image to which the data in the subareas compressed by said compression means corresponds;

decompression means for decompressing the data in the subareas compressed by said compression means; and second expansion means for expanding the image data decompressed by said decompression means in an area on the band buffer determined based on location information managed by said management means.

5. The image processing device as claimed in claim 4 wherein the image processing performed by said image data preparation means is rotation processing.

\* \* \* \* \*